Figure 1:
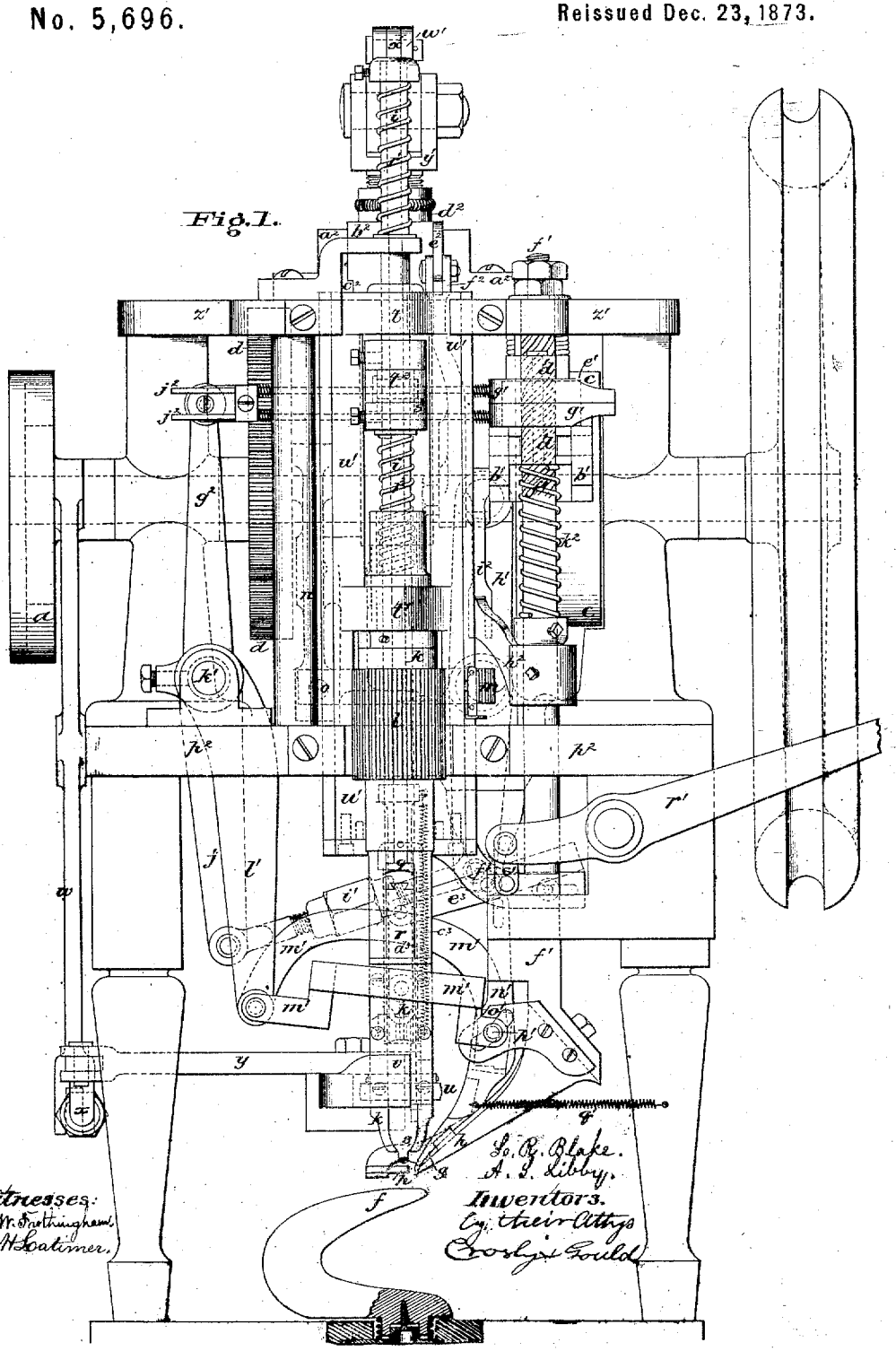
Figure 2:
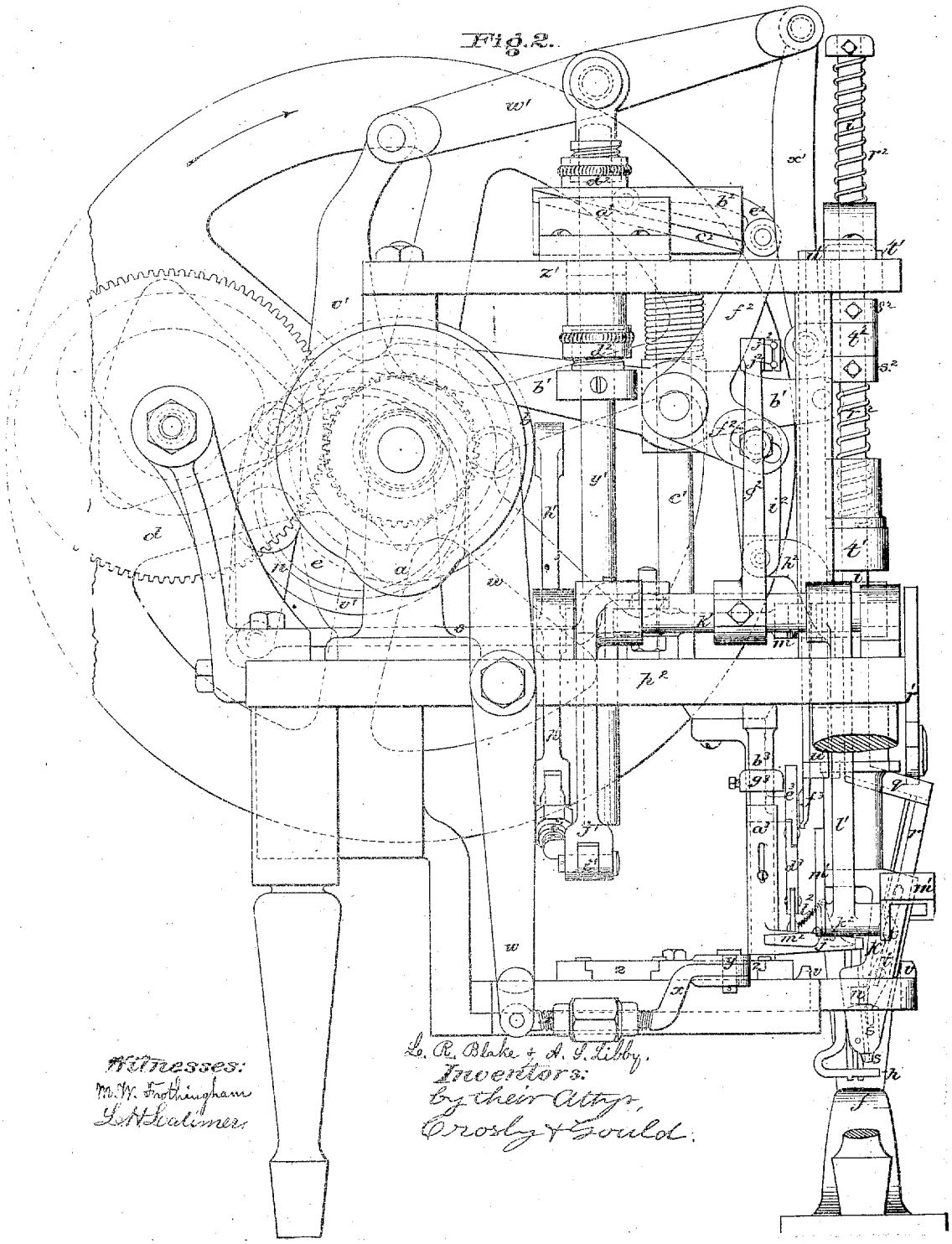
Figure 3:
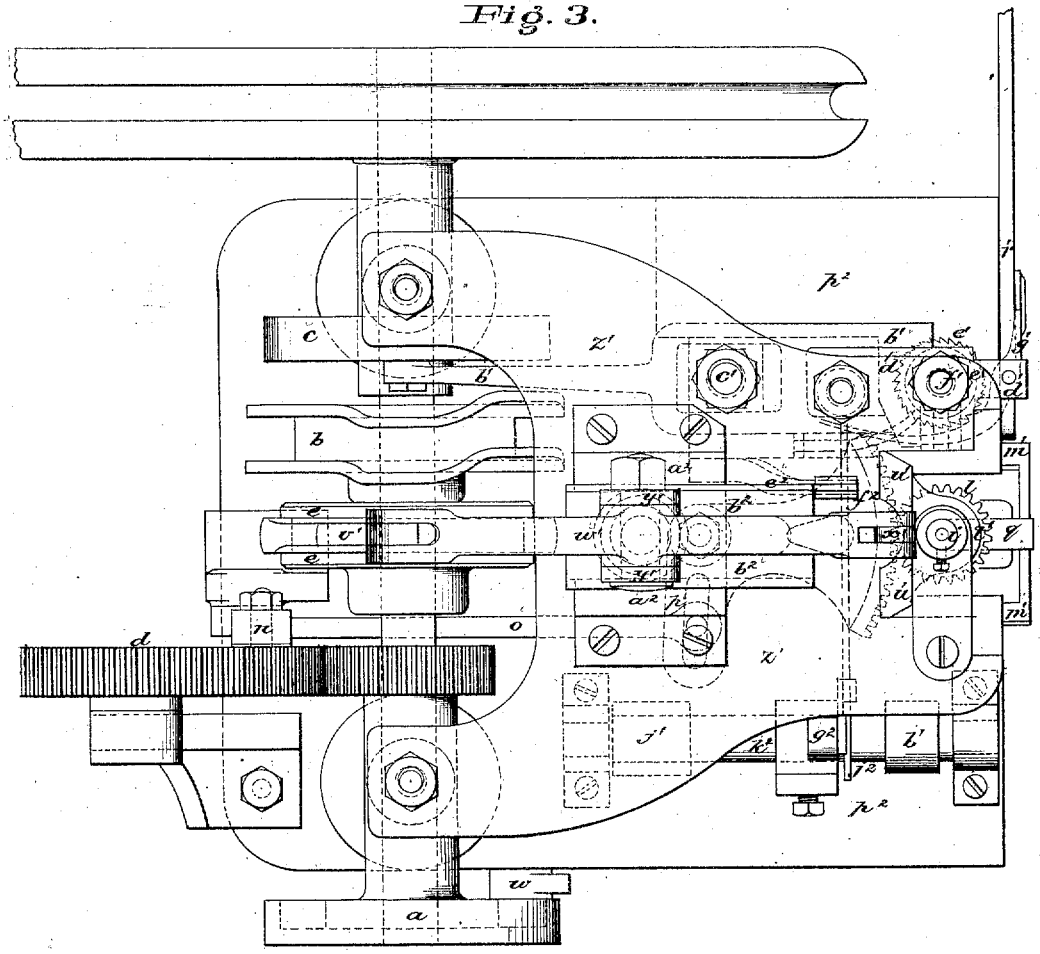
Figure 4:
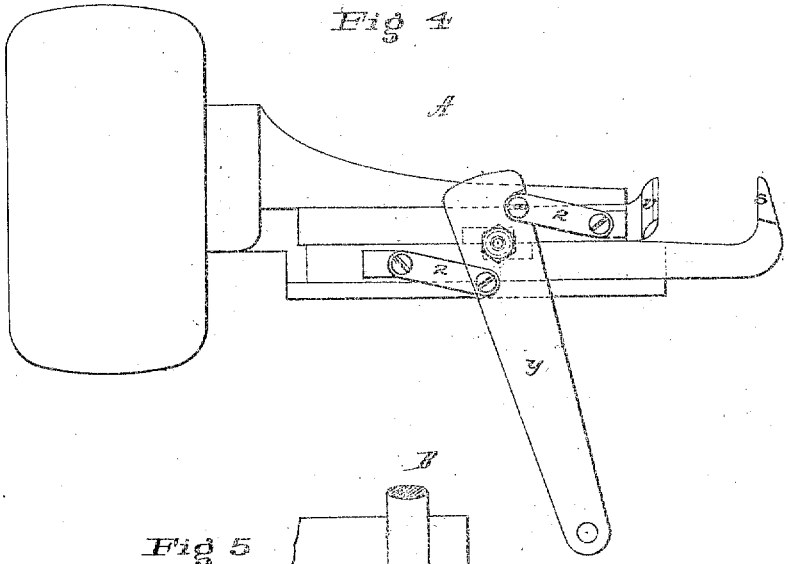
Figure 5:
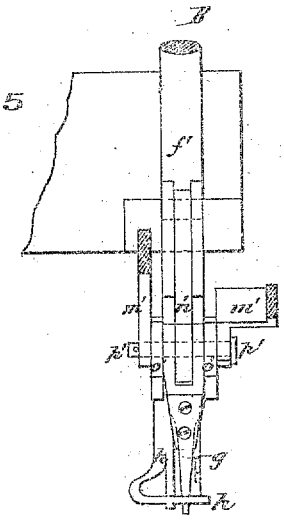

4 Sheets--Sheet 1.

L. R. BLAKE & A. S. LIBBY.

Nailing-Machines for Boots and Shoes.

No. 5,696. Reissued Dec. 23, 1873.

L. R. BLAKE & A. S. LIBBY.

Nailing-Machines for Boots and Shoes.

No. 5,696. Reissued Dec. 23, 1873.

Witnesses:
M. M. Frothingham
L. H. Hedimer

L. R. Blake & A. S. Libby,
Inventors:
by their Attys,
Crosby & Gould.

4 Sheets--Sheet 3.

L. R. BLAKE & A. S. LIBBY.

Nailing-Machines for Boots and Shoes.

No. 5,696. Reissued Dec. 23, 1873.

Witnesses:
M. M. Frothingham.
L. H. Latimer.

L. R. Blake
A. S. Libby,
Inventors.
by their Attys
Crosby & Gould

4 Sheets--Sheet 4.

L. R. BLAKE & A. S. LIBBY.

Nailing-Machines for Boots and Shoes.

No. 5,696. Reissued Dec. 23, 1873.

Witnesses
M. W. Fothingham.
L. H. Latimer.

L. R. Blake & A. S. Libby.
Inventors.
By their Attys
Crosby & Gould.

UNITED STATES PATENT OFFICE.

LYMAN R. BLAKE, OF BOSTON, AND ASA S. LIBBY, OF LAWRENCE, ASSIGNORS TO GORDON McKAY, TRUSTEE OF THE McKAY SEWING-MACHINE ASSOCIATION, OF BOSTON, MASSACHUSETTS.

IMPROVEMENT IN NAILING-MACHINES FOR BOOTS AND SHOES.

Specification forming part of Letters Patent No. 76,150, dated March 31, 1868; reissue No. 5,633, dated December 23, 1873; application filed December 15, 1873.

*To all whom it may concern:*

Be it known that LYMAN R. BLAKE, of Boston, Suffolk county, and ASA S. LIBBY, of Lawrence, Essex county, all in the State of Massachusetts, invented certain new and useful Improvements in Machines designed for Securing Soles to the Uppers of Boots and Shoes by Nailing, of which invention the following, taken in connection with the drawings which accompany and form part of this specification, is a description sufficient to enable those skilled in the art to practice it.

This invention relates to certain novelties of construction, of combination, of arrangement, and of detail, whereby we are enabled, by the employment of mechanism, to secure, with ease and despatch, the soles of boots and shoes to their uppers with nails, or pins, or pegs, of metal or other suitable material; the specific organization shown in the accompanying drawing being particularly designed to produce the manufacture patented to said Blake, August 8, 1865, in the United States, under the number 49,215.

The invention consists, in one particular, in combining, with a mechanism which inserts nails or pins of metal, or other suitable material, by driving, (by pressure or percussion,) a device, which, from its inclined form and arrangement, is termed a horn, and which acts as a support for the work, and as an anvil on which the blow or thrust of the driver is ultimately received, and on which the nails or pins may be clinched or slightly enlarged on their entered ends. In another particular this invention consists, in the combination named, of such an arrangement of the horn as will permit of its being turned either with the boot or shoe, or within the boot or shoe thereon, the point of the horn being of such width and thickness that it may be entered into the smallest space between the vamp and the inner sole, and the shoe or boot being presented, fed, and turned on and with the horn, in a manner similar to that practiced by operators on the machine known as the McKay sole-sewing machine. In this machine, the thickness of the parts to be united is measured or calipered between clamping devices, one of which may be the upper surface of the point of the horn, and the other the under surface of the presser-foot, which bears on the outer surface of the sole; and one part of the invention consists in the use of a mechanism which determines automatically the length to which the nails or pins shall be cut, so that the nails or pins shall, in all and variable thicknesses, be long enough to reach through the stock, with a little extra length for clinching or heading, if desirable; and with relation to this item of our invention it consists, further, in combination therewith, of means for causing all the nails or pins to exceed or fall short of the exact thickness of the materials united to any amount desired by the operator, which amount is determined by his adjustment of the mechanism. The invention further consists of the combination, with mechanism by which nails or pins are fed and cut off from a long wire, strip, or rod, of means for driving such nails or pins in a direction inclined longitudinally, or in direction of the general line of the fastenings, in contradistinction to an inclination sidewise or laterally, or toward or from the edge of the sole; though the arrangement may be such that the nails or pins will be driven with a lateral as well as with a longitudinal inclination, the lateral inclination being given toward the center of the shoe, to insure the entry of the nails or pins into the inner sole, even when they are driven from near the edge of the outer sole. In connection with the longitudinal inclination given to the nails or pins, the invention further consists in combining, with mechanism for cutting them from a wire, strip, or bar of considerable length, a means for driving the nails or pins in opposite inclined directions, with the inclination in the general direction of the row or line made by the driving. Another part of the invention consists in means which operate always to bring the driver down to the variable height of the surface of the work—or, in other words, to a variable distance from the surface of the horn—that is, a distance above the horn corresponding with the thickness of the material at the point to be operated upon, no matter what that thickness may be, within reasonable limits, or the ordinary range of variation in the thickness of boot and shoe soles at their different parts, not including the thickness of raised heels, as contradistinguished from spring-heels, which raised heels it is not intended to secure by this machine to the soles. In connection with this part of the invention, it may here be stated, that while the stroke of the driver may commence and end at different heights, the range of motion between the beginning and ending of each stroke is constant, and is, in amount, at least equal to, and may be in excess of, the length of the longest nail or pin designed to be driven by the machine.

In this invention, the nail is severed from the wire before it is driven, and is driven without the preaction of an awl or other puncturing device; and one part of the invention consists in uniting the sole and upper of a boot or shoe by nails cut to variable lengths, in accordance with the varying thickness of the parts to be united, the nails being variably cut from wire automatically, or without arresting the action of the machine, and each forming its own passage into the leather. Another part of the invention consists in the combination of a variable wire-feed mechanism, a nail-severing mechanism, a nail-driving mechanism, and a nail which punctures the leather for its insertion therein; and the invention further consists in uniting the soles and uppers of boots and shoes by cutting the nails from wire to lengths proportioned to the varying thickness of the parts to be united by them, and with points that will clinch against the resisting surface that supports the parts to be united.

Of the drawings illustrating an embodiment of my invention, there is on Sheet 1 a front elevation of a machine containing the improvements; on Sheet 2 there is a side elevation of the same; and on Sheet 3 there is a plan of said machine.

Sundry views of details or detached portions of the machine may be referred to hereafter as A, B, and so on.

It may here be stated that the drawings show the parts of a full-sized machine, except that the frame is omitted and the horn is shown as dwarfed.

The machine is organized to make use of wire, which may be flat instead of round, if desired, from which the nails or pins are automatically cut off in the machine to the lengths required by the varying thicknesses of the work.

On the main shaft, driven by the balance-wheel in the direction indicated by the arrow thereon, are located all the cams (except one) which are employed to give motion to various parts of the mechanism, *a* being the cam which works the wire-cutters, *b* the cam which works the shoe-feed, and *c* the cam which works the presser-foot, there being also on said shaft an eccentric, *e*, which operates the nail-driver, and a gear which meshes into a gear formed on cam *d*, which operates to rotate the nail-tube.

To aid in tracing the operations of the somewhat complex mechanism in this machine, we will, before describing it in detail, give a short statement of what is effected thereby.

The horn or inclined anvil *f* is made capable of rotation, and, with a boot or shoe slipped upon it, sole uppermost, is swung around by manipulation of the operator so as to allow the shoe to be moved by what we will term, for convenience, the sole-feed, which is the device marked *g*, and which, after each operation of driving a nail or pin in the sole, feeds or moves the latter the distance which it is desired to have exist between the centers of two adjacent nails or pins, the operator turning the horn with the shoe, and also in it, in the manner well understood by operators of the machine now known publicly as the McKay sole-sewing machine.

There is a presser-foot, marked *h*, which, except at the time of that movement of *g* which feeds the shoe, presses the sole down upon the horn, the presser-foot at the time the shoe is fed being lifted automatically by the mechanism, and automatically, after the feed movement of the sole is effected, descends and rests on the surface of the sole. Provision is also made by which, in some positions of the mechanism, the feeder *g* and the presser-foot *h* can both together be raised by the operator, so as to facilitate the placing upon or the taking off from the horn a boot or shoe.

Located concentrically with respect to the upward continuation of the axis about which the horn rotates is a tube, *i*, through which wire is led from a coil above the machine to the device, which seizes and draws down, to be delivered to the cutters, such lengths of the wire as may be called for by the thickness of the sole at the place where the wire is to be driven. The piece containing the wire-feeder is marked *j*. The tube *i* operates to work the driver, this being located within the piece *k*, which is arranged to be vibrated, with tube *i*, one hundred and eighty degrees after the driving of each pin or nail, there being at and in the lower end of *k* a pivoted tube for reception of the pins as cut from the wire, said tube being then substantially in the axial line of tube *i*, and being afterward, by proper provisions for the purpose, swung or inclined to conform to the inclined direction of the driver. It is the rotation of piece *k* and the movement described as given to the tube in the end thereof that, in connection with the operation of the inclined driver, cause the nails or pins to be driven in oppositely-inclined directions to each other, while the sole-feeding device determines the distance apart of the nails.

In tracing the mechanism in its construction and operation, we will, for the sake of clearness, endeavor to treat of each part separately, as, when separately understood, it will be easier to understand the joint operations of all the parts and their connection one with the other. The piece *k* is so fitted on the tube *i* that, while one may be moved longitudinally with respect to the other, they both turn together, say, about one hundred and eighty degrees, said turning being effected through the medium of the long-toothed pinion $l$ on the upper part of $k$, into which pinion meshes the segment-gear $m$, this being worked from cam $d$, through the arm $n$, link $o$, and arm $p$, which form part of the segment $m$, said arm $p$ being slotted, so that the extent of movement of the segment may be accurately adjusted. At about the middle of piece $k$ it is slotted through on one side, so that an arm, $q$, on the end of tube $i$, can project for the purpose of working the slide $r$ or carrier of the nail-driver, which is inclined with respect to the axis of the tube, the arm $q$ having, from its lower surface, a dovetailed groove, in which fits a dovetail-connection made on the upper end of slide $r$, so that as slide $r$ is forced up and down in its inclined socket or ways made in the piece $k$, and thus moves toward and from the center of the tube, the connection between the arm $q$ and slide $r$ is maintained. Opposite the inclined part of $k$ its material is cut away to give room for the piece $j$, which carries the wire-feeder, so that it can operate in the axial line of tube $i$. The slide $r$ carries, in its end, a wire, which acts to impinge upon the upper end of the nails or the cut-off pieces of wire, to force them through the tube, which is pivoted in the slot in the end of $k$, and into the sole. This tube is marked $s$, and its lower end bears upon the sole when the nails are driven therein. It is pivoted in $k$, so that its bore may be brought into line with the axis of the tube $i$, and so that the wire may be fed directly into it, and so that said tube $s$ may be inclined to correspond with the inclination of slide $r$, and the driver carried thereby, so that said driver may, in its reciprocations, enter said tube $s$, and drive out therefrom, and into the sole, the nail contained in the tube, the nail forming its own passage into the leather, or puncturing the leather without the prior action of an awl for that purpose. Pivoted within the lower and inclined part of $k$ is a lever, $t$, said lever having pins in its ends, one entering a cam-groove in the nail-driver carrier $r$, and the other entering a slot in the tube-piece $s$, so that when the grooved piece $r$ is reciprocated the lever $t$ is vibrated, and causes the tube-piece $s$ to assume a vertical position for reception of the nails, or an inclined position for the driving of the same, the vertical position of the nail-tube being had when the driver-carrier is at the top of its stroke, and the inclined position of the nail-tube being obtained from the first part of the downward movement of the driver-carrier.

The mechanism thus far described is best shown in Sheet 2, partly in dotted lines, where inclosed or covered by other parts of the machine.

In piece $k$, and above the tube-piece $s$, in a mortise parallel with the axis which the nail-tube $s$ vibrates, are the cutters $u$, which sever the short pieces from the coil of wire, thus forming the nails. These cutters are of steel, and can move toward and from the axis of tube $i$. They are formed to an edge by a bevel on the upper side, which makes the wire pins or nails square on the ends which are to receive the action of the nail-driver, and chisel-edged, with a bevel on each side at the ends of the nails which enter the leather. The edges of the cutters are prevented from destroying each other by abutments left on the cutting-ends. These cutters are forced apart by the wire itself as it is fed downward, and are made to cut off the wire by the grasp of jaws $v$, which are made, by the action of cam $a$, through the lever $w$, link $x$, lever $y$, and links $z$ $z$, to move, guided in ways, toward and from the cutters.

The detail drawing on Sheet 3, marked A, is a plan, showing the lever $y$, links $z$ $z$, the cutter-jaws $v$ $v$, and the ways in which they slide.

The presser-foot $h$ bears on the surface of the sole in the vicinity of the place where the nail is driven, and, as shown in the drawing, may partially surround the end of the nail-tube $s$ where this bears on the surface of the sole. The presser-foot is worked from its cam $c$, through the lever $b^1$, pivoted on the fulcrum-post $c^1$, and carrying in its forked end a frame, $d^1$, which contains the nut $e^1$, having ratchet-teeth formed on its periphery, the threads in the nut being formed to fit and move freely on the sharply-pitched threads formed on the upper end of the rod $f^1$, to which the presser-foot is connected. The frame $d^1$ carries two pawls, $g^1$ $g^1$, which are kept in gear with the teeth of the ratchet-nut $e^1$ by springs till, by mechanism to be referred to beyond, the said pawls are removed from the teeth of the ratchet, when the spring, which is seen located around the rod $f^1$ and beneath the frame $d^1$, acts to cause the rod $f^1$ and the presser-foot to drop, if not then resting, at the time when the frame $d^1$ is at the lowest position which it can receive from action of cam $c$ on the sole; the descent of rod $f^1$ causing rotative movement of the ratchet-nut. As the rod $f^1$ has a rectangular part, which is fitted to slide in suitable guides in the frame-work, and cannot therefore rotate, it will be clear that if the forked end of the lever $b^1$ vibrates downward when the presser-foot rests on the surface of the sole, the ratchet-nut will turn on the screw-threads on rod $f^1$, whether the pawls are left free to act on the ratchet-nut or not, the ratchet-teeth on the nut being inclined in such a direction as to permit such rotation of the nut in the direction which will then be caused; but when said end of said lever vibrates upward, then the pawls hold the ratchet-nut from turning, and the presser-foot will be raised by lever $b^1$.

Thus it will be seen that the presser-foot is raised a fixed distance from any thickness of work which may rest upon the end of the horn, and it will be shown hereafter how the variable positions which the presser-foot is thus made to assume, consequent upon the thickness of the work, are made to cause the driver to operate to and from variable points, but always moving a constant distance or length of stroke to suit the varying thickness of the work on the horn, and also how the position of the presser-foot on thick or thin work is made to control the lengths of the nails or pins which are fed and cut off from the wire.

By allowing the fulcrum-post $o'$ to move more or less by means of adjustable check-nuts, which may be applied thereto, more or less of the entire throw of the presser-foot cam $c$ may be utilized in lifting the presser-foot, and thus its range of motion may be varied, though the throw of the cam is constant.

Fixed to the rocker-shaft $k^1$ is a rocker-arm $g^2$, which vibrates at such a time that it acts, through the link $j^2$, to pull the pawls $g^1$ out of gear with the ratchet-teeth on the nut $e^1$, at the time when the nut-frame $d^1$ is at its lowest position, so that the presser-foot may then drop down on the surface of the work, to hold it on the horn under the action of the nail-driving mechanism. On the two parts of this link $j^2$ are coiled springs, which always act to keep the pawls in gear with the teeth of the ratchet, except when the link pulls on the pawls, which, in yielding or moving out of the ratchet-teeth, compress said springs.

The sole-feeder $g$ is worked from its cam $b$ through the lever $h^1$, adjustable link $i^1$, rocker $j'$, rocker-shaft $k^1$, rocker $l'$, and links $m^1$ $m^1$, the feeder $g$ being hung to a link, $n^1$, working on a pin in a slot in the presser-rod $f^1$, the upper end of said link $n^1$ being slotted so that it can rise and fall on the pin, the feeder being influenced in its movement by inclined slots in pieces $o'$ fixed to the presser-foot, as pins $p$, in the feeder $g$, fit in said slots, and the movement of said feeder $g$ is still further effected by the inclined shape of the presser-foot itself, and by the retractile spring $q'$, which tends to keep the point of the feeder closely against the inclined surface of the presser-foot. When the rod $f^1$ is lifted by manipulation of the lever $r^1$ by the operator, said rod $f^1$, and lever $r^1$, being connected by link $s^1$, the feeder $g$ is also lifted therewith, through the connection of the pins $p'$ in the pieces $o'$. The tube $i$ is guided in bearings $t'$ fixed to a frame, $w'$, which is capable of vertical movement. The reciprocations of tube $i$ are caused from the eccentric $e$, through its strap and arm $v'$, the lever $w'$, and link $x'$. The lever $w'$ is pivoted to a vertical post, $y'$, capable of some limited vertical movement. On the top plate $z'$ of the machine, and on either side of the fulcrum-support $y'$, are pieces $a^2$, having inclined tongues or guides, on which slides, as a carriage, the piece $b^2$, the top and bottom to which piece are parallel to each other. In said piece $b^2$ are inclined grooves $c^2$, fitting the inclined guides mentioned, and the piece $b^1$ is mortised through vertically and longitudinally, so that it may be permitted to slide between the adjustable shoulders $d^2$ on the fulcrum-post $y'$, said shoulders, by their contact with the upper and lower surfaces of $b^2$, influencing the motion transmitted from the eccentric to the tube $i$. The piece $b^2$ is connected with the presser-bar $f^1$ by means of the link $e^2$, bent lever $f^2$ pivoted on the fulcrum-post $c'$ of the presser-lever $b^1$, link $i^2$, and bracket $h^2$ secured to the presser-bar $f^1$, so that it will be seen that the higher the position of the presser-foot the higher will be the upper and lower surfaces of $b^2$, and the higher will be the positions taken by the fulcrum of the lever $w'$, which, of course, will result in a corresponding change of position in all the parts operated through said lever, including the end of the nail-tube $s$, which is about in the plane of the operative face of the presser-foot. The tube $i$ has upon it a coupling, $p^2$, secured between two adjustable collars, $s^2$, said coupling being connected to the lever $w'$ by the link $x'$. In forcing down tube $i$, the springs $r^2$ $r^2$ are compressed, which compression reacts, when link $x'$ ascends and aids in elevating the tube $i$. The presence and action of these springs during the ascent of tube $i$ keep the fulcrum-post $y'$ from falling, and the upper shoulder $d^2$ from contact with the upper surface of $b^2$ till the expansion of said springs $r^2$ is expended, when $w'$, being no longer supported at both ends, acts as a lever pulled down by the eccentric $e$, and lifts tube $i$ the remaining distance which it has to move, the fulcrum of lever $w'$ falling till arrested by the upper surface of $b^2$. The slide or frame $u'$ is moved upward by contact of the upper collar $s^2$ with the under side of the upper bearing $t'$ of the tube $i$, and is moved downward through the medium of the springs $r^2$ till arrested by contact of the lower end of piece $k$ with the presser-foot $h$, the tube $s$, and the parts to which it is connected, being moved vertically by and with the frame $w'$. The throw of the eccentric being constant, though not all used, by reason of the play permitted the fulcrum-rod $y'$, it follows that the movement of tube $i$, and of the nail-driver thereby operated, is constant in amount, though stopping and starting from different points, according as the piece $b^2$ assumes a higher or a lower position, in accordance with the position of the presser-foot on thick or thin stock placed on the end of the horn $f$. To change the amount of movement given the tube $i$ by the eccentric $e$, adjust the position of the collars $d^2$. The presser-foot has given to it a positive lift of an amount greater than the difference in the thickness of any material likely to be presented at the different points where any two adjacent nails are to be inserted. The time of the lift of the presser-foot is just before the work is fed or moved on the horn, and the pawls $g^1$ being then in the teeth of the ratchet-nut, the lever $b^1$ lifts the presser-foot as far as it lifts the nut-frame $d^1$. When the stock has been fed on the horn, then the nut-frame assumes the lowest position which it can be made to assume by mere movement of lever $b^1$, and then the pawls $g^1$ are thrown out of gear with the ratchet-teeth on the nut, and the spring $k$ around the presser-bar throws the presser-foot down on the stock, the nut in the frame being rotated by the descent of the presser-bar, the stock on the horn being held by the pressure exerted by said spring $k^2$. After the short end of lever $b^1$ has vibrated downward, and after the descent of the presser-foot on the stock, the pawls are returned into gear with the ratchet-teeth on the nut, so that at the next upward movement of said short end of said lever, the presser-foot is again lifted to allow the feed-movement of the stock on the horn. Thus it will be seen that the presser-foot acts to clamp and to relieve the stock from clamp on the horn; also, that the lift of the presser-foot is uniform in amount from any thickness of stock—that is, the lift of the presser-foot is a constant measurement from variable points or surfaces.

Whenever thick stock succeeds to thin by the operation of the feed, the presser-foot in its descent rests on the stock before the nut-frame completes its downward stroke, and during the time while the nut-frame moves down, when the presser-foot and bar do not move, the nut rotates in the direction permitted by the shape of the ratchet-teeth.

In many respects this machine is based upon the machine well known to boot and shoe manufacturers as the McKay sole-sewing machine, which this invention has changed from a machine adapted to sewing with thread and a needle, to a machine for driving nails, pins, or pegs, for the purpose of fastening soles to boots and shoes. In the said McKay machine the needle, when it pulled up the thread, kept the stock up against the lower face of the presser-foot. As we have no thread, we mount our horn on a spring, so that it can have a small amount of vertical movement to follow the lift of the presser-foot, the horn, however, resisting solidly the thrust of the presser-foot and the driving of the nail. The amount of spring movement given to the horn is but slight—say, about one-eighth of an inch in a full-sized working-machine. A spring is shown on Sheet 1, so placed under the horn as to cause it to rise when the presser-foot is lifted.

To effect the feed of the wire to be cut into nails, the following devices are employed: The arm $j$ contains a yielding or spring nipper or pawl, which, after moving up over the wire, seizes it and draws it down, forcing it between the cutters to be cut off thereby. Said arm $j$ is fixed on a sleeve, $a^3$, which can slide on a guide, $b^3$, to effect which sliding movement, there is applied the spring $c^3$, which draws up sleeve $a^3$, which is thrust down by link $d^3$, operated by lever $e^3$, which is moved by contact with a pin or roll on projection $f^3$, secured to the bottom of and moving with the frame $w^1$, the end of said projection being slotted, so that the friction-roll may be moved with reference to the fulcrum of said lever to modify the movement thereof. The movement of the projection $f^3$ is through the leverage shown, and when all of said movement is utilized enough to produce a feed movement sufficient for the longest pin or nail for the thickest stock. To utilize all of the movement of said projection in producing the feed of the wire, adjust the collar $g^3$ on the post-guide $b^3$, so that when the presser-foot is resting in the highest position designed for it on the sole, the spring $c^3$ shall bring the upper end of the sleeve $a^3$ into contact with the collar $g^3$ and at the same time the pin or roller in the projection $f^3$ into contact with the lever $e^3$; then the upward movement of projection $f^3$ will all be utilized in operating to feed the wire. Then, when the presser-foot rests on thinner stock, the sleeve $a^3$ will remain in contact with the collar $g^3$, and as the pin in projection $f^3$ will then have to move some distance before striking the lever $e^3$, the amount of nail-feed movement will be lessened by reason of the lost motion between said lever and the pin in projection $f^3$. When the collar $g^3$ is adjusted so that the nails are fed to be cut off in exact accordance with the thickness of the sole, lowering the collar $g^3$ will cause all the nails to fall short of said thickness, and raising it will cause them to exceed it.

On Sheet 2 may be seen, in dotted lines, the pawl-lever $k^2$, which is pivoted in the piece $j$, the long arm of the lever being provided with the spring $l^2$. On inspection of the drawing it will be seen that the arrangement of said pawl-lever and its spring is such that when the piece $j$ moves upward the pawl will slip upward on the wire, and when the piece $j$ moves downward the pawl $k^2$ will bite upon the wire and feed it downward. To stop the operation of the wire-feed there is provided a bent lever, $m^2$, which the operator can manipulate to throw the feeding end of the pawl $k^2$ away from the wire.

In the drawings the tube $i$ and the parts connected therewith for the purpose of driving the nails, are shown as arranged so as to drive the nails about parallel with the edges of the soles in which they are inserted; but in practice we shall incline the top of tube $i$ outward, this inclination of said tube, and a similar inclination of the other parts directly operative in the driving of the nails, operating to incline the nails toward the center of the shoe.

Claims:

1. A work-supporting horn, substantially as described, in combination with a mechanism which operates to drive nails or pins by pressures or percussion.

2. In combination with a nailing mechanism a rotating work-supporting horn.

3. In combination with a nailing mechanism a horn that yields and moves in a vertical direction, substantially as described.

4. The combination, with the presser-foot, of mechanism which operates, by reason of any change in height at which the presser-foot rests on the stock, to automatically cut nails or pins from material supplied for that purpose, to a length proportioned to the thickness of the work at the place where the presser-foot operates.

5. In combination with mechanism by which nails are supplied to the action of a nail or pin driving mechanism, means for automatically driving the nails in a direction which is inclined in the general direction of the row of driven nails.

6. Means for automatically driving each nail in an inclined direction opposite to the inclination of the driven nail preceding, substantially as described.

7. In combination with the presser-foot or other device resting on the surface of the stock, and with the nail-driver, means for automatically changing the position of the operative end of the driver, so that the point to which said end will descend at each stroke will depend upon the thickness of the stock at the point where operated upon and will have a definite relation to the surface of the stock at each descent of the driver.

8. The process or method of uniting the soles and uppers of boots and shoes, by successively cutting nails from a continuous wire, the lengths of which are varied as the thickness of the material to be united changes, and driving each in succession into the solid or imperforate leather held against the nail-tube foot.

9. For uniting the soles to the uppers of boots and shoes by means of nails cut from continuous wire, the combination of the following instrumentalities: First, a wire-feeding mechanism, so constructed that the lengths of the nails cut from the wire can be altered without arresting the action of the nailing-machine; second, a wire-nail-driving mechanism; and third, nails cut from a continuous piece of wire of sufficient stiffness to penetrate the soles and uppers of boots and shoes without the previous action of an awl or piercing-instrument.

10. For uniting the soles of boots and shoes to their uppers by metallic nails or fastenings cut from continuous wire, the combination of a wire-feeding mechanism, so arranged that the length of the nails may be altered to suit the varying thickness of the stock without arresting the action of the machine, with nails or metallic fastenings, so formed that their points or ends which first enter the stock shall clinch on the inner sole or inside of the shoe against a horn or similar resisting surface, causing the fastening to clinch.

GORDON McKAY.

Witnesses:
ROBERT CALL,
L. BORET.